United States Patent
Stange et al.

(10) Patent No.: US 6,247,652 B1
(45) Date of Patent: Jun. 19, 2001

(54) NOZZLE HOLDER TO BE FIXED TO A MOTOR VEHICLE

(75) Inventors: Rüdiger Stange, Nentershausen; Rolf-Dieter Schlein, Rotenburg, both of (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/319,897

(22) PCT Filed: Dec. 9, 1997

(86) PCT No.: PCT/EP97/06861

§ 371 Date: Aug. 16, 1999

§ 102(e) Date: Aug. 16, 1999

(87) PCT Pub. No.: WO98/26964

PCT Pub. Date: Jun. 25, 1998

(30) Foreign Application Priority Data

Dec. 14, 1996 (DE) .............................. 196 52 083

(51) Int. Cl.⁷ ...................................... B05B 1/10
(52) U.S. Cl. .................... 239/284.1; 239/587.1; 239/587.5; 239/587.6
(58) Field of Search ............... 239/284.1, 284.2, 239/587.5, 587.6, 587.1, 130, 133, 132.3; 15/250.002, 250.003

(56) References Cited

U.S. PATENT DOCUMENTS

| 1,733,521 | * | 10/1929 | Wuesthoff | 239/587.5 |
| 2,990,980 | * | 7/1961 | Gronemeyer | 239/587.5 |
| 5,957,385 | * | 9/1999 | Suhring et al. | 239/284.1 |

FOREIGN PATENT DOCUMENTS

| 0215528 | * | 10/1909 | (DE) | 239/587.6 |
| 3906657 | | 8/1989 | (DE) . | |
| 3906657 | * | 2/1991 | (DE) | 239/284.1 |
| 3925800 | * | 2/1991 | (DE) | 239/284.1 |
| 4305245 | * | 8/1994 | (DE) . | |
| 2677938 | * | 12/1992 | (FR) | 239/587.1 |
| 803093 | * | 10/1958 | (GB) | 239/284.1 |

* cited by examiner

Primary Examiner—David A. Scherbel
Assistant Examiner—Dinh Q. Nguyen
(74) Attorney, Agent, or Firm—Martin A. Farber

(57) ABSTRACT

A nozzle assembly (2) for a washing nozzle (6) of a windshield washing system is pivotably mounted in a recess (3) of a body panel (4). The nozzle assembly (2) has an eccentric (11), by which the angle of inclination of the washing nozzle (6) can be set in relation to a windshield (1) to be cleaned. Tolerances of the nozzle assembly (2) and of the body panel (4) can thereby be compensated in a simple way.

27 Claims, 3 Drawing Sheets

NOZZLE HOLDER TO BE FIXED TO A MOTOR VEHICLE

FIELD OF THE INVENTION

The invention relates to a nozzle assembly provided for fastening in a motor vehicle and having a washing nozzle for a windshield washing system.

Washing nozzles fastened in such a nozzle assembly are often used in present-day motor vehicles for cleaning windshields or headlamp glasses and are therefore known. The nozzle assembly has, for example on its side facing away from the washing nozzle, a plurality of catch elements which are arranged on spring arms and engage behind the edge of a recess of a body part adjacent to the windshield to be cleaned. The nozzle assembly can thereby simply be pressed into the recess, until it is held securely by the catch elements.

A disadvantage of the known device is that the recess and the body panel have tolerances which make it impossible for the washing nozzle to be aligned exactly with the windshield to be cleaned. Also after deformation of the body part holding the nozzle assembly, for example due to an accident of the motor vehicle, an intended alignment of the washing nozzle with the windshield is no longer ensured. This is unacceptable, particularly in the case of windshield cleaning systems, in which the washing nozzles wash the windshield simply by spraying washing fluid onto it, without rewiping with a windshield wiper, since, in such cases, it is especially important to align the washing nozzle exactly for thorough cleaning of the windshield.

SUMMARY OF THE INVENTION

It is a object of the invention to provide a nozzle assembly of the initially mentioned type, in such a way that tolerances of the body parts adjacent to the windshield to be cleaned do not cause any misalignment of the washing nozzle.

This objective is solved, according to the invention, by means for adjusting the angle of inclination of the washing nozzle.

By virtue of this, the nozzle assembly according to the invention is first fastened in the motor vehicle. The washing nozzle can subsequently be oriented into its intended position in relation to the windshield to be cleaned. Tolerances of the nozzle assembly or of the body panel holding the nozzle assembly are thereby compensated simply by adjusting the angle of inclination of the washing nozzle.

The means for adjusting the angle of inclination of the washing nozzle could, for example, have a joint, by means of which the inclination of the washing nozzle in the nozzle assembly can be adjusted. However, according to an advantageous development of the invention, the means for adjusting the angle of inclination of the washing nozzle are of particularly simple development wherein the nozzle assembly is mounted pivotably in or opposite to the spraying direction of the washing nozzle and has an adjustable stop on the nozzle assembly side located opposite the pivotable mounting. The nozzle assembly, and consequently the washing nozzle, can thereby be pivoted by an adjustment of the stop.

According to another advantageous development of the invention, the outlay in terms of construction of the nozzle assembly is kept particularly low if the nozzle assembly is prestressed against the adjustable stop by means of a spring element. Furthermore, by virtue of this development, the nozzle assembly bears reliably with its stop on the body part.

According to another advantageous development of the invention, a nozzle assembly provided for fastening in a recess of a body panel of the motor vehicle can be produced particularly cost-effectively if the pivotable mounting is formed to engage in a forklike manner round one edge of the recess, and if the spring element has a projection bearing on the edge of the recess and prestressing the nozzle assembly against the pivotable mounting. Furthermore, the advantage of this development is that tolerances of the nozzle assembly or of the recess cannot lead to a loose fit or difficult mounting of the nozzle assembly in the recess.

According to another advantageous development of the invention, the nozzle assembly can be produced particularly cost-effectively if it is manufactured in one piece with the spring element and with a mounting for the adjustable stop.

According to another advantageous development of the invention, the angle of inclination of the washing nozzle can be adjusted particularly finely if the adjustable stop has an eccentric. Furthermore, the angle of inclination of the nozzle assembly is held reliably in its set position by self-locking of the eccentric.

According to another advantageous development of the invention, a lateral tilting of the nozzle assembly in the recess can be reliably avoided if the adjustable stop has two eccentrics arranged at a distance from one another.

According to another advantageous development of the invention, the eccentrics are mounted particularly simply if the two eccentrics are connected to one another by means of a shaft rotatably mounted in the nozzle assembly.

According to another advantageous development of the invention, the eccentrics can be fastened to the nozzle assembly in a simple way if the nozzle assembly has at least one bearing shell partially surrounding the shaft of the eccentric.

The body panels are often arranged at a lateral inclination relative to the windshield to be cleaned. This leads, particularly in the case of a fluidic nozzle with a striplike spraying region as a washing nozzle, to an inclined spraying region on the windshield. According to another advantageous development of the invention, an intended inclination of the spraying region on the windshield can be set particularly simply if the eccentrics are individually mounted on the nozzle assembly. The eccentrics can thereby be adjusted independently of one another, so that, in addition to the angle of inclination, the angle of rotation of the washing nozzle can also be set.

According to another advantageous development of the invention, the nozzle assembly is held permanently in its set position if the mounting of the eccentrics has a press fit. The eccentrics can thereby be adjusted only with relatively great effort.

According to another advantageous development of the invention, a basic setting of the angle of inclination of the nozzle assembly can be made in a simple way if the eccentrics or the shaft have a catching point. This is advantageous, particularly when the device according to the invention is produced as standard, since, thereby, the nozzle assembly, when being mounted, can be set particularly quickly into a position determined by the catching point. Only when a tolerance limit is exceeded or there is an unfavorable addition of the tolerances of the components is the angle of inclination of the washing nozzle reset.

According to another advantageous development of the invention, the angle of inclination of the washing nozzle can be set over a particularly wide range of adjustment, and fixed permanently in the set position, wherein the adjustable stop is setable by means of a screw. The substantially higher outlay in terms of construction due to such a screw, as compared with the eccentric, often does not lead to an increase in the manufacturing costs of the nozzle assembly, since the latter, because of its wide range of adjustment, is suitable for use in different types of motor vehicles with different dimensions.

BRIEF DESCRIPTION OF THE DRAWINGS

The invention permits numerous embodiments. To make its basic principle even clearer, one of these is illustrated in the drawings and is described below. In the drawings.

DETAILED DESCRIPTION OF THE PREFERRED EMBODIMENT

Figure 1:
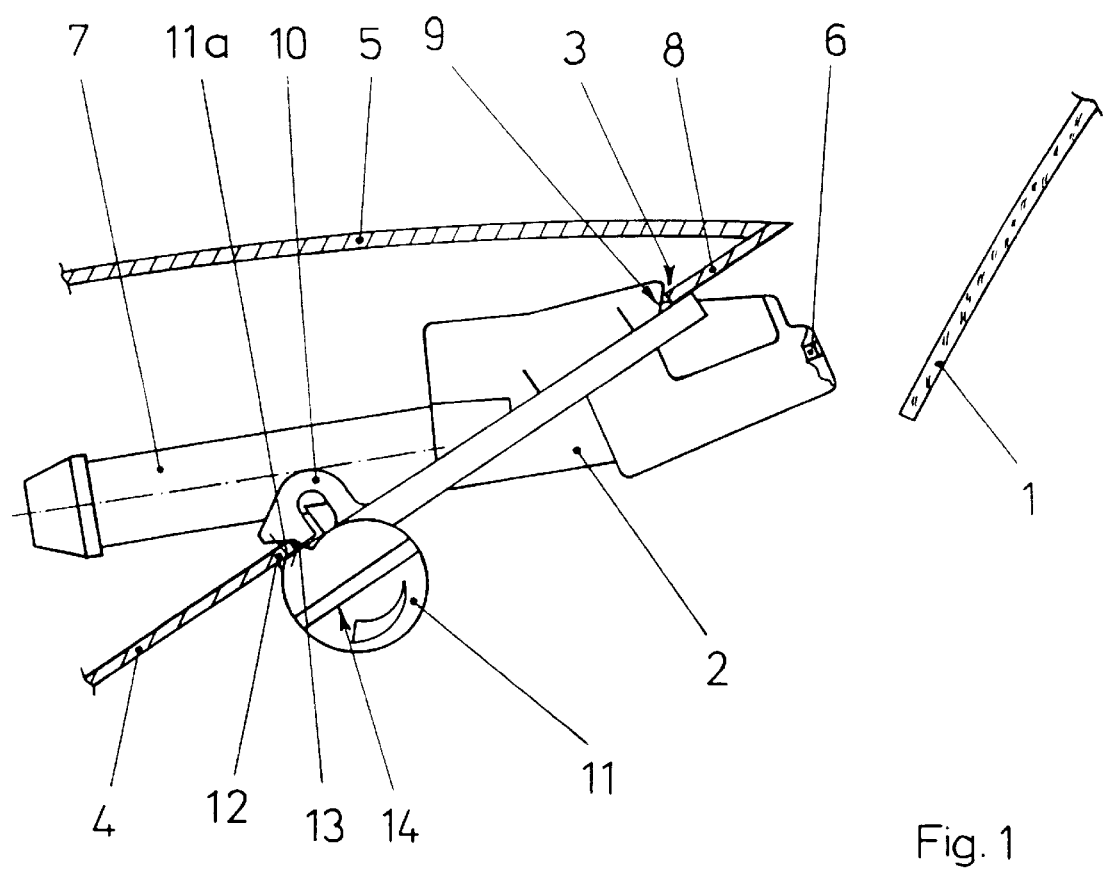
FIG. 1 shows a nozzle assembly fastened in a recess of a body panel.

FIG. 1 shows a nozzle assembly 2 arranged in front of a motor vehicle windshield 1 to be cleaned. The nozzle assembly 2 is fastened in a recess 3 of a body panel 4 below an external panel 5 of the motor vehicle. The nozzle assembly 2 carries, on its side facing the windshield 1, a washing nozzle 6 which may be formed, for example, as a fluidic nozzle. On the side facing away from the washing nozzle 6, the nozzle assembly 2 has a connection piece 7 for a washing fluid line which is not illustrated.

The nozzle assembly 2 is formed to be forklike at one end and to engage round the edge 8 of the recess 3 of the body panel 4. The nozzle assembly 2 thereby has a pivotable mounting 9 at this point. On the side located opposite the pivotable mounting 9, the nozzle assembly 2 has a spring (springy) element 10 and a stop 11a adjustable by an eccentric 11. One edge 12 of the recess 3 is clamped between the spring element 10 and the eccentric 11. Furthermore, the spring element 10 has a projection 13 which prestresses the nozzle assembly 2 against the mounting 9. The eccentric 11 has a slot 14 for applying a screwdriver which is not illustrated. When the eccentric 11 is rotated, the nozzle assembly 2 is pivoted and, consequently, the angle of inclination of the washing nozzle 6 relative to the windshield 1 is adjusted. The eccentric 11 is formed to be self-locking due to its low pitch, so as to prevent it from being adjusted independently.

Figure 2:
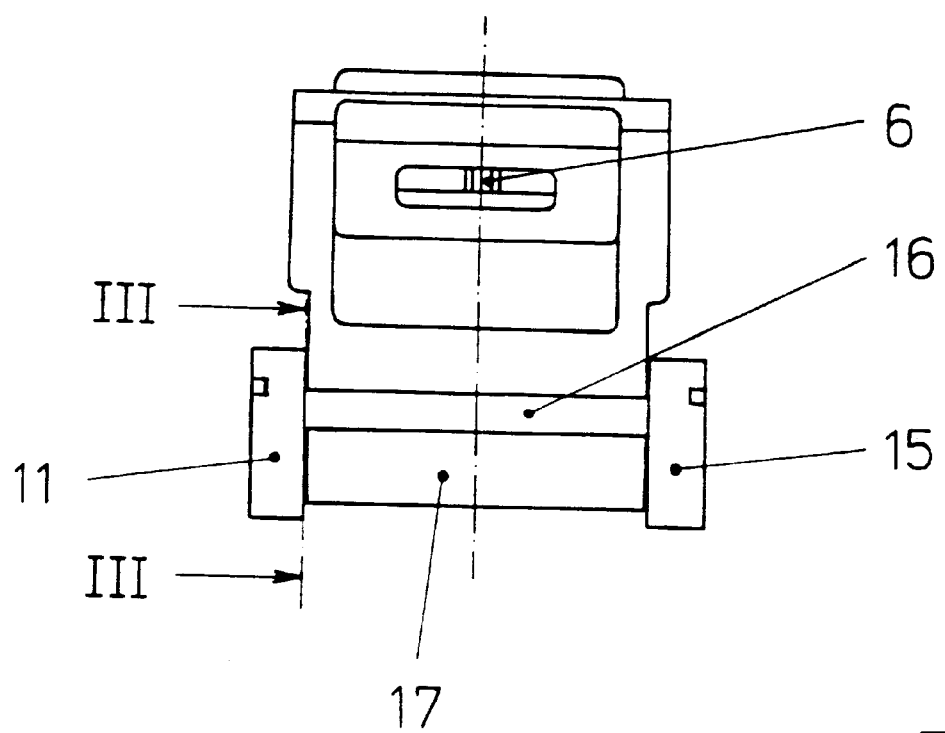
FIG. 2 shows the nozzle assembly of FIG. 1, as seen from a nozzle.

FIG. 2 shows, in a side view of the nozzle assembly 2 of FIG. 1, that two eccentrics 11, 15 arranged on both sides of the nozzle assembly 2 are provided for setting the angle of inclination of the washing nozzle 6. The eccentrics 11, 15 are connected to one another via a shaft 16 and can thereby be rotated simultaneously. The shaft 16 is held rotatably in a partly open bearing shell 17.

Figure 3:
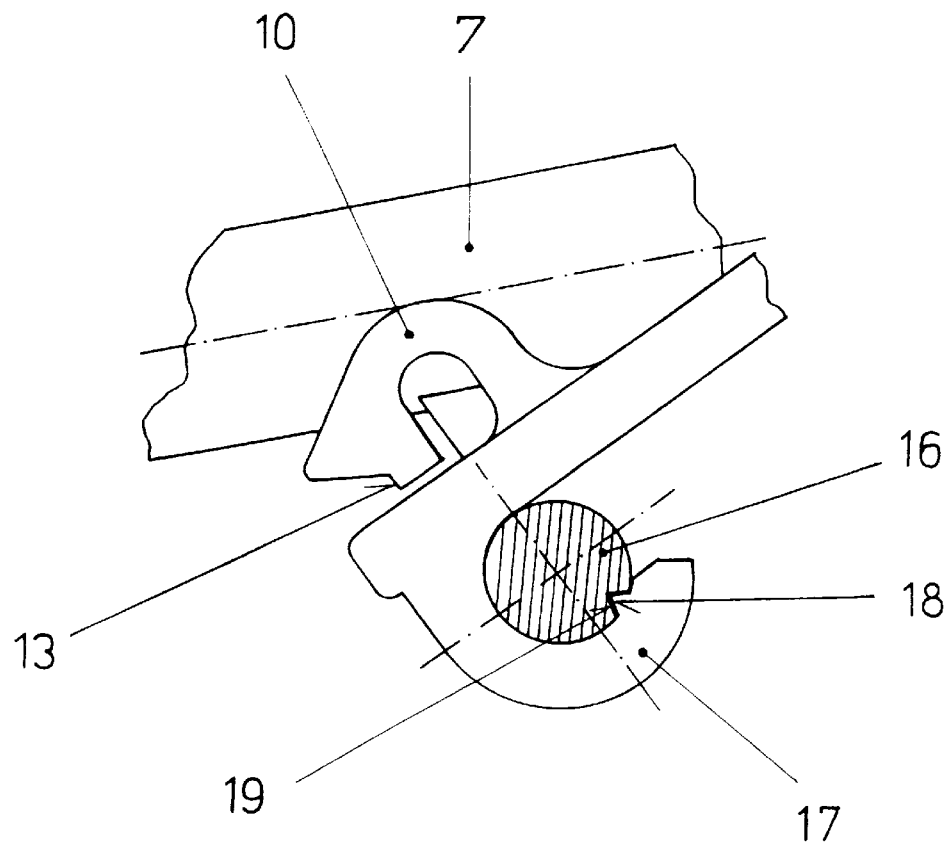
FIG. 3 shows a sectional illustration through the nozzle assembly of FIG. 2 along the line III—III.

FIG. 3 shows the formed of the bearing shell 17 in an enlarged sectional illustration along the line III—III of FIG. 2. The bearing shell 17 surrounds the shaft 16 over approximately 270°. The shaft 16 can thereby simply be pressed through the open region into the bearing shell 17 and is subsequently held positively in the latter. For marking a basic position of the eccentrics 11, 15, the bearing shell 17 has, on its inside, a projection 18 which, in the position shown, engages into a groove 19 of the shaft 16.

What is claimed is:

1. A nozzle assembly provided for fastening in a motor vehicle and having a washing nozzle for a windshield washing system, comprising means for adjusting an angle of inclination of the washing nozzle (6) with respect to the vehicle, said adjusting means comprising an adjustable stop adapted to abut the vehicle, and a springy element for prestressing said adjustable stop, and an eccentric, wherein said adjustable stop is mounted so as to be adjustable by said eccentric.

2. The nozzle assembly as claimed in claim 1, wherein the nozzle assembly (2) is mounted pivotably in or opposite to a spraying direction of the washing nozzle (6) and said means has said adjustable stop (11a) on its side located opposite a pivotable mounting (9) of the washing nozzle.

3. The nozzle assembly as claimed in claim 2, wherein the nozzle assembly (2) is prestressed against the adjustable stop (11a) by said springy element (10).

4. The nozzle assembly, which is provided for fastening in a recess of a body panel of the motor vehicle, as claimed in claim 3, wherein the pivotable mounting (9) engages in a forklike manner at one edge (8) of the recess (3), and wherein the springy element (10) has a projection (13) bearing on another edge (12) of the recess (3) and prestressing the nozzle assembly (2) against the pivotable mounting (9).

5. The nozzle assembly as claimed in claim 4, wherein said another edge of said recess is clampable between said springy element and said eccentric.

6. The nozzle assembly as claimed in claim 5 wherein said stop is on said eccentric, wherein said another edge of said recess is clampable between said springy element and said adjustable stop.

7. The nozzle assembly as claimed in claim 3, wherein the nozzle assembly (2) is formed in one piece with the springy element (10) and with a bearing shell mounting (17) for the adjustable stop (11a).

8. The nozzle assembly as claimed in claim 2, wherein the adjustable stop (11a) is formed on said eccentric (11, 15).

9. The nozzle assembly as claimed in claim 2, wherein the adjustable stop (11a) is formed on two of said eccentrics (11, 15) arranged at a distance from one another.

10. The nozzle assembly as claimed in claim 9, wherein the two eccentrics (11, 15) are connected to one another by a shaft (16) rotatably mounted in the nozzle assembly (2).

11. The nozzle assembly as claimed in claim 10, wherein the nozzle assembly (2) has at least one bearing shell (17) partially surrounding said shaft (16), and wherein said shaft is rotatable in said shell.

12. The nozzle assembly as claimed in claim 10, wherein said eccentrics or the shaft (16) have a catching point (projection 18).

13. The nozzle assembly as claimed in claim 9, wherein said eccentrics (11, 15) are individually mounted on the nozzle assembly (2) so as to be independently adjustable.

14. The nozzle assembly as claimed in claim 13, wherein the mounting of said eccentrics (11, 15) has a press fit.

15. The nozzle assembly as claimed in claim 1, wherein the adjustable stop (11a) is settable by means of a screw or screwdriver.

16. The nozzle assembly as claimed in claim 1, wherein said springy element is resilient and is formed as a hook having a base integral with the washing nozzle, said hook having a free end spaced adjacent said adjustable stop and adapted to clamp a body panel of said vehicle therebetween.

17. The nozzle assembly as claimed in claim 1, wherein said adjustable stop is self-locking.

18. A nozzle assembly provided for fastening in a motor vehicle, comprising a washing nozzle for a windshield washing system, means for adjusting an angle of inclination of the washing nozzle (6) with respect to the vehicle, wherein the nozzle assembly (2) is mountable pivotably in or opposite to a spraying direction of the washing nozzle (6), and said adjusting means has an adjustable stop (11a) on a side thereof located opposite a pivotable mounting (9) of the washing nozzle, wherein the nozzle assembly (2) is prestressed against the adjustable stop (11a) by a spring element (10), wherein the nozzle assembly is provided for fastening in a recess of a body panel of the motor vehicle, wherein the pivotable mounting (9) has a single, rigid V-shaped Divot which engages in forklike manner around one edge (8) of the body panel at one edge of the recess (3), which Divot pivots relative said one edge of said body panel upon adjustment of said adjusting means such that said one edge of the body panel abuts both sides of the V-shaped pivot in all angles of inclination of the washing nozzle (6) with respect to the vehicle, and wherein the spring element (10) has a projection (13) bearing on another edge (12) of the recess (3) and prestressing the nozzle assembly (2) against the pivotable mounting (9).

19. A nozzle assembly provided for fastening in a motor vehicle, comprising a washing nozzle for a windshield washing system, means for adjusting an angle of inclination of the washing nozzle (6) with respect to the vehicle, wherein the nozzle assembly (2) is mountable pivotably in or opposite to a spraying direction of the washing nozzle (6), and said adjusting means has one adjustable stop (11a) on a side thereof located opposite a pivotable mounting (9) of the washing nozzle, wherein the nozzle assembly (2) is prestressed against the adjustable stop (11a) by a spring element (10), wherein the nozzle assembly (2) is formed in one piece with the spring element (10) and with a mounting (17) for the adjustable stop (11a), wherein said adjustable stop has an eccentric and said adjustable stop is mounted so as to be adjustable by said eccentric.

20. A nozzle assembly provided for fastening in a motor vehicle comprising a washing nozzle for a windshield washing system, means for adjusting an angle of inclination of the washing nozzle (6) with respect to the vehicle, wherein the nozzle assembly (2) is mountable pivotably in or opposite to a spraying direction of the washing nozzle (6), and said adjusting means has an adjustable stop (11a) on a side thereof located opposite a pivotable mounting (9) of the washing nozzle, wherein the adjustable stop (11a) has an eccentric (11, 15).

21. A nozzle assembly provided for fastening in a motor vehicle comprising a washing nozzle for a windshield washing system, means for adjusting an angle of inclination of the washing nozzle (6) with respect to the vehicle, wherein the nozzle assembly (2) is mountable pivotably in or opposite to a spraying direction of the washing nozzle (6), and said adjusting means has an adjustable stop (11a) on a side thereof located opposite a pivotable mounting (9) of the washing nozzle, and wherein the adjustable stop (11a) has two of said eccentrics (11, 15) arranged at a distance from one another.

22. The nozzle assembly as claimed in claim 21, wherein the two eccentrics (11, 15) are connected to one another by a shaft (16) rotatably mounted in the nozzle assembly (2).

23. The nozzle assembly as claimed in claim 22, wherein the nozzle assembly (2) has at least one bearing shell (17) partially surrounding the shaft (16) of the eccentric (11, 15).

24. The nozzle assembly as claimed in claim 22, wherein the eccentrics or the shaft (16) have a catching point (projection 18).

25. The nozzle assembly as claimed in claim 21, wherein the eccentrics (11, 15) are individually mounted on the nozzle assembly (2).

26. The nozzle assembly as claimed in claim 24, wherein the mounting of the eccentrics (11, 15) has a press fit.

27. A nozzle assembly provided for fastening in a motor vehicle, comprising a washing nozzle for a windshield washing system, means for adjusting an angle of inclination of the washing nozzle (6) with respect to the vehicle, wherein the nozzle assembly (2) is mountable pivotably in or opposite to a spraying direction of the washing nozzle (6), and said adjusting means has an adjustable stop (11a) on a side thereof located opposite a pivotable mounting (9) of the washing nozzle, wherein the nozzle assembly (2) is prestressed against the adjustable stop (11a) by a spring element (10), wherein the nozzle assembly (2) is formed in one piece with the spring element (10) and with a mounting (17) for the adjustable stop (11a), wherein said mounting is a bearing shell.

* * * * *